Sept. 7, 1926.

O. F. WARHUS 1,599,152

STEERING MECHANISM FOR VEHICLES

Filed Oct. 25, 1924 2 Sheets-Sheet 1

INVENTOR
Oliver F. Warhus
BY
ATTORNEYS.

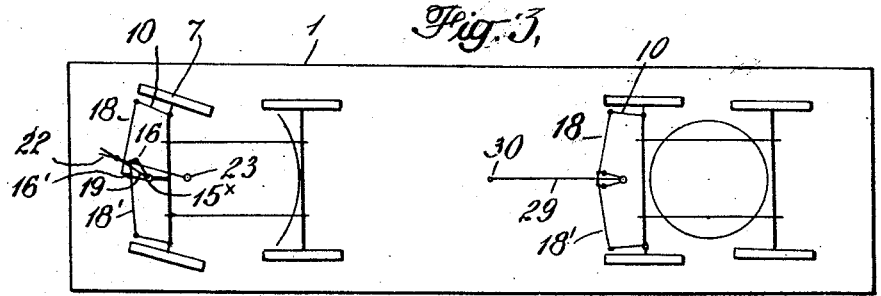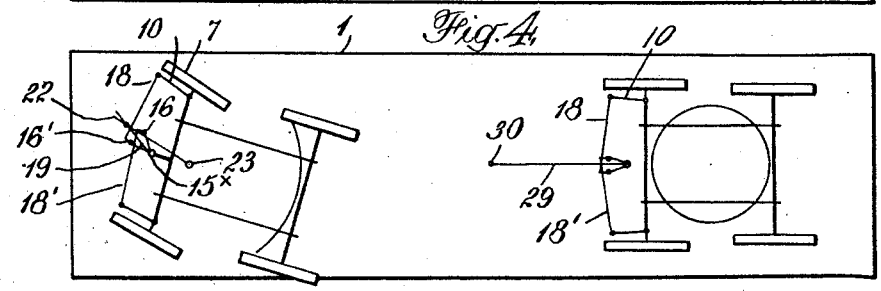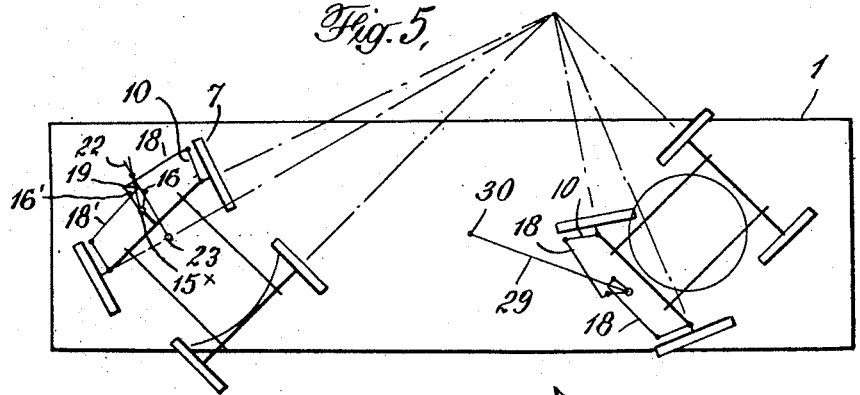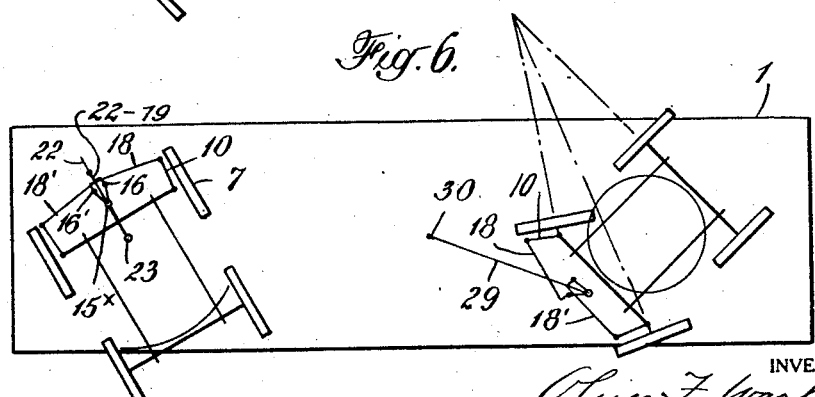

Patented Sept. 7, 1926.

1,599,152

UNITED STATES PATENT OFFICE.

OLIVER F. WARHUS, OF ALBANY, NEW YORK, ASSIGNOR, BY MESNE ASSIGNMENTS, TO VERSARE CORPORATION, A CORPORATION OF NEW YORK.

STEERING MECHANISM FOR VEHICLES.

Application filed October 25, 1924. Serial No. 745,875.

This invention relates to steering mechanism for vehicles and particularly to vehicles having a relatively long body mounted on two trucks each of which has a swivel connection with the body.

It has been proposed to steer vehicles of this type by providing steering mechanism for the front wheels of the front truck controlled by the operator of the vehicle, and by providing automatic steering mechanism for the front wheels of the rear truck controlled by the lateral movement of the vehicle body so that the rear truck tends to follow in the path of the front truck.
With steering mechanism as heretofore proposed for such vehicles, it has been found difficult to exercise the desired accurate control by reason of the fact that when the front wheels of the front truck are first deflected, there is a lag between this movement and the resulting movement of the vehicle body, especially in vehicles of considerable length. This lag is confusing to the operator of the vehicle and leads to turning the front wheels of the front truck more than is desirable and the front truck makes more of a swiveling movement under the vehicle body than is desired or intended.

One object of the present invention is to provide an improved form of steering mechanism for a double-truck vehicle which is simple in construction and by which the steering movement of the vehicle can be readily and accurately effected with the vehicle at all times under complete control.

Another object is to provide improved steering mechanism for vehicles of the herein disclosed type which will enable the vehicle to be under perfect control at all times, whereby the vehicle may be made to turn corners or pursue other irregular courses in full compliance with a predetermined plan.

A further object is to provide steering mechanism for vehicles of the aforesaid type, which will assure the operator of the vehicle that the front truck will not swivel under the vehicle body more than an amount which is proposed by the operator at the time of setting or actuating the steering mechanism.

The invention has for a further object to provide means whereby steering of the front wheels of the front truck will result in substantially a simultaneous lateral movement of the forward end of the vehicle body. In other words, the forward end of the vehicle body will start to move laterally approximately as soon as the truck is steered, thus eliminating the above mentioned objectionable lag.

The invention is illustrated in the accompanying drawings, in which—

Figs. 3 to 6 inclusive are explanatory diagrams illustrating the swiveling motion of the trucks under the vehicle body during the act of steering the vehicle.

Figure 1:
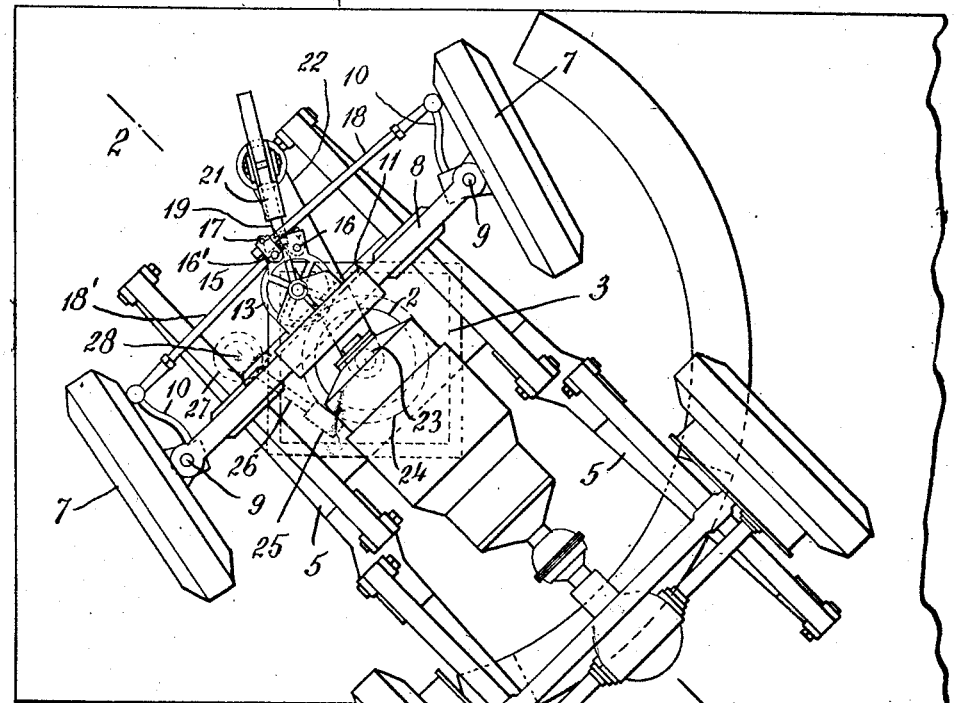
Fig. 1 is a bottom view of the front truck of a two-truck vehicle, showing the improved steering mechanism applied to the front wheels of the truck, the steering mechanism being shown in a condition which will cause the front truck to swivel under the vehicle body and assume a position which is at an angle with respect to the longitudinal axis of the vehicle.
Figure 2:
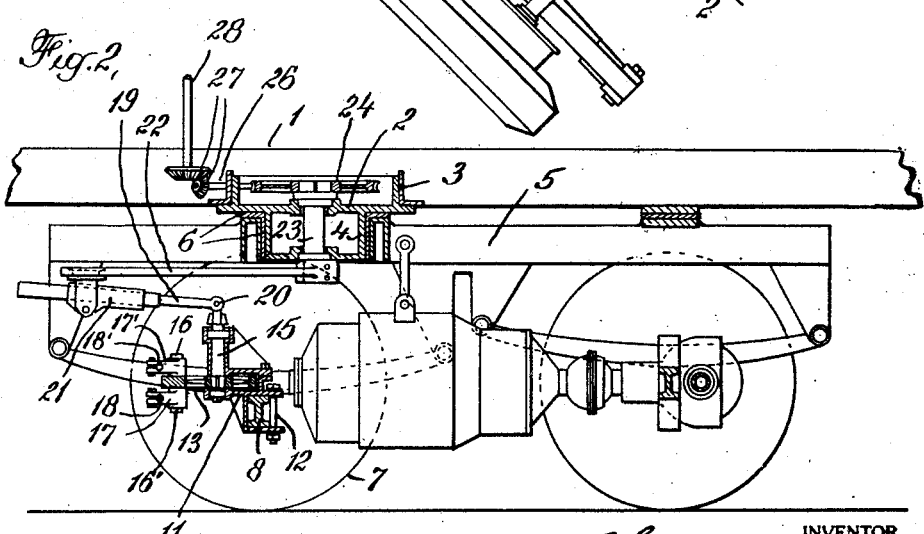
Fig. 2 is a section taken on the line 2—2 of Fig. 1.

The frame of the vehicle body is represented in the drawings at 1. The front truck is swiveled to the body 1 by means of a king pin 2 (Figs. 1 and 2). The king pin 2 preferably has an upper square portion 3 set in and secured to the body frame 1, and a lower portion 4 which constitutes the journal or pin proper on which the truck swivels. The truck frame 5 is provided with a suitable opening to receive the journal portion of the king pin. Suitable anti-friction bearing material 6 is preferably interposed between the journal portion of the king pin and the cooperating faces of the truck frame. It will be noted that the axis of the king pin is not coincident with the central vertical axis of the truck. That is, the truck is not swiveled at a central point between the four wheels to the body frame in the usual manner, but is swiveled to the body frame at a point which is considerably in advance of the central point between the four wheels. In fact, the king pin is preferably located as nearly over the front axle of the truck as possible. In the present instance it is located just to the rear of the front axle. The front truck is swiveled to the body frame in this manner for the purpose of effecting a prompt response on the part of the vehicle body when the truck is steered. In other words, when the front wheels and the front truck are steered, as soon as the front wheels move off of their straight ahead path the forward end of the vehicle body will respond and will start to move laterally. This gives an indication to the operator of the vehicle that the front truck has started to swivel. Otherwise expressed, the forward end of the vehicle body starts to move laterally almost as soon as the front wheels of the front truck move out of their straight ahead course, hence the operator of the vehicle is assisted in determining the amount which the front truck should be steered because the movement of the body serves as a reliable indication of the action of the front truck.

A portion of the steering mechanism for the front wheels 7 of the front truck is the same as the steering mechanism for the front wheels of the rear truck disclosed in my copending application, Serial No. 735,063, filed August 30, 1924. The front wheels 7 are pivotally connected to the front axle 8 to turn about substantially vertical axes 9. The pivoted member of each front wheel is provided with a crank arm 10 by which turning movement of the wheel about its pivotal axis 9 is effected.

The front axle 8 has a supporting member or housing 11 (Fig. 2) secured thereto by means of bolts 12, and this housing forms a pivotal support for a rotatable member 13. This rotatable member 13 is shown in the drawings as having the form of a wheel. A pin 15 is mounted to turn in the housing 11 and is secured to the rotatable member 13. Therefore, when the pin 15 is made to rotate it imparts rotation to the member 13. The rotatable member 13 is connected at points at opposite sides of its center line to the two front wheels 7 of the front truck. A stud 16 is mounted on the upper face of the forward edge of the member 13 and forms a pivotal support for a clamping member 17, whose outer end is split and is provided with an opening to receive one end of a connecting bar 18 which is clamped in the opening by tightening a bolt passing through the split end of the clamp. The opposite end of the connecting bar 18 is pivotally connected to the outer end of the crank arm 10 of one of the front wheels 7 of the truck. It will be noticed that this stud 16 is mounted on the rotatable member 13 a short distance to one side of the center line of the rotatable member when the latter is in the central position.

On the bottom of the forward edge of the rotatable member 13, and an equal distance on the other side of the center line of the rotatable member, is a similar stud 16′, on which a clamp 17′ is pivotally mounted, and from this clamp a similar bar 18′ extends to the crank arm 10 of the other front wheel 7.

The steering mechanism thus far described is substantially like the steering mechanism for the front wheels of the rear truck in my copending application above referred to. In the present instance, the rotatable member 13 is actuated by means of an arm or tongue 19 connected to the pin 15 at 20. The arm 19 is mounted to slide in a sleeve 21 which is pivotally connected to a second arm 22 that is rigidly secured to a stub shaft 23 vertically disposed within the king pin 2. The upper end of the stub shaft 23 carries a worm gear 24 which meshes with a worm 25 (Fig. 1) mounted on the end of a shaft 26. The shaft 26 is actuated through beveled pinions 27 from an actuating shaft 28 extending to and actuated by a steering wheel on the vehicle. It will now be noted that when the shaft 28 is actuated the worm wheel 24 will rotate and the resulting rotation of the stub shaft 23 will cause the arm 22 to swing in one direction or the other in a horizontal plane. This will cause a corresponding horizontal swinging movement of the arm or tongue 19, which in turn will effect a turning movement of the member 13, thereby to actuate the connecting bars 18 and 18′ to deflect the front wheels 7. Due to the fact that the studs 16 and 16′ of the two bars 18 and 18′ are at different points about the circumference of the rotatable member 13 the movement of the parts controlling one front wheel is more effective in causing the turning movement of that wheel than that of the parts of the other wheel. The result is that one of the front wheels will be deflected more than the other, the parts being so arranged that for any given turning radius each front wheel is substantially at right angles to a radius drawn from the center of the wheel to the point about which the truck travels as a center. The function of the steering mechanism described above and the part which it plays in accomplishing the objects of the invention will be described later after a brief description has been given of the steering mechanism for the rear truck.

The steering mechanism for the rear truck in its entirety forms the subject matter of the aforementioned copending application. As stated above, a part of the steering mechanism for the front truck is a duplication of the corresponding portion of the steering mechanism of the rear truck. That is, the front wheels of both trucks are steered by means of the crank arms 10, connecting bars 18 and 18′, and a rotatable member 13 similar to corresponding parts on the front truck. However, in the steering mechanism for the rear truck the rotatable member 13 is actuated, not by a short tongue as in the case of the front truck, but by means of a telescopic bar 29 connected at one end to the member 13 and at its other end to the body frame at 30. When the steering mechanism for the front truck is actuated to steer the vehicle, while the vehicle is moving forwardly, the direction of the center line of the vehicle body is changed due to the lateral movement of the forward portion of the body, and this moves the end 30 of the telescopic bar 29 laterally. Inasmuch as the bar 29 is secured to the rotatable member 13, the lateral movement of the bar 29 will turn the rotatable member 13 and thereby effect steering of the front wheels of the rear truck.

The operation of the steering mechanism will now be described and in this connection reference will be made to the explanatory diagrams in Figs. 3 to 6 inclusive, illustrating the different positions of the trucks with respect to the body frame. Let it be assumed that the vehicle is moving forward in a straight line. The longitudinal axes of the trucks will then coincide with the longitudinal axis of the body and all of the eight wheels will be in alignment and parallel with the longitudinal axis of the vehicle. If it be desired to steer the vehicle, for instance to turn a corner, the steering wheel on the vehicle is actuated to turn the shaft 28. This imparts rotation to the shaft 26 through beveled pinions 27. The shaft 26 in turn actuates the worm wheel 24. The stub shaft 23 to which the worm wheel is connected rotates therewith and causes the arm 22 to swing in a horizontal plane and this will turn the pin 15 and the rotatable member 13 to effect steering of the front wheels of the front truck through the intermediary of the bars 18 and 18' and the crank arms 10. Let it be assumed, for the sake of explanation, that it is desired to make a rather sharp turn, to effect which it is necessary to bring the longitudinal axes of the trucks to the positions shown in Fig. 6. In order to accomplish this in practice the steering wheel would no doubt be turned gradually, as in steering any vehicle, but in order to make the operation of the present mechanism clear it will be assumed that in order to bring the trucks to the position illustrated in Fig. 6 the steering wheel, instead of being gradually actuated, is turned in a series of steps. It might be assumed, for instance, that the first movement of the steering wheel brings the arm 22 to the position indicated in Fig. 3. This will cause the tongue 19 to move to the position shown in this figure, and the bars 18 and 18' will deflect the front wheels to the angle shown. Inasmuch as the vehicle is moving forwardly the deflection of the front wheels of the front truck will immediately be followed by a swiveling action of the front truck under the vehicle body because the front truck then tends to pursue an arcuate course. As soon as the truck starts to swivel relative to the body frame, the point 15$^x$ (corresponding with the pin 15 and the axis of rotation of the tongue 19) will move toward a position directly under the arm 22, which up to this time, supposedly, has been held stationary with respect to the vehicle body.

Inasmuch as the forward end of the tongue is held against movement by the arm 22 and inasmuch as the point 15$^x$ moves toward a position under the arm 22 as just described, it is obvious that during the swiveling action of the truck the front wheels will be reversely turned toward their initial position in alignment with the rear wheels of the front truck thereby terminating the swiveling action. Now suppose, at this point, that the steering wheel is further actuated to shift the arm 22 to the position indicated in Fig. 4. This will further deflect the tongue 19 and will again turn the front wheels of the front truck. The front truck is therefore caused to swivel an additional amount with respect to the body frame and during this swiveling action the point 15$^x$ will again move toward its position under the arm 22 and the front wheels will again be reversely turned toward their position of alignment with the rear wheels. The additional swiveling action of the truck will increase its angular relation with respect to the longitudinal axis of the body. The steering wheel is now moved to its final position to bring the arm 22 to the position shown in Figs. 5 and 6. The tongue 19 being further deflected will cause the front wheels of the front truck to be turned again with a consequent further swiveling movement of the front truck under the vehicle body. The point 15$^x$ will again move toward its position under the arm 22 and the front wheels will again be reversely turned toward their position of alignment with the rear wheels. The front truck will then have reached the angular position with respect to the body shown in Fig. 6. As stated above, in practice the arm 22 would be turned gradually, in which event the point 15$^x$ would tend to follow it because so long as the arm 22 is being turned the front wheels are being deflected and consequently the front truck is swiveling thereby moving the point 15$^x$ toward its position under the arm 22. When the arm 22 is permitted to come to rest the point 15$^x$ would theoretically move to its final position directly under the arm 22. Figs. 3 to 5 inclusive illustrate the movement of the point 15$^x$ toward the position under the arm 22 while the arm is being gradually moved to the position shown in Fig. 6. The direction of the longitudinal axis of the vehicle body will start to change as soon as the front truck has swiveled far enough to impart lateral motion to the forward end of the body. When the longitudinal axis of the vehicle body starts to change its direction, the movement of the point 30 causes the telescopic arm 29 to be deflected to effect steering of the rear truck as shown in Figs. 5 and 6. This steering action of the rear truck would be produced gradually and would increase in accordance with the amount of lateral movement of the forward end of the vehicle body, but in order to simplify the explanation, the action of the rear truck has not been illustrated in Figs. 3 and 4. When the rear truck swivels to an angle which is determined by the amount of lateral movement of the forward end of the body, it will follow the front truck, but will move in an arc of a circle having a shorter radius than that of the arc described by the front truck.

It has been stated that the point $15^x$ would theoretically reach a final position under the arm 22 as shown in Fig. 6 when the arm 22 is allowed to come to rest. It will be noted, however, that this would cause the front truck to move in a straight line whereas the rear truck is moving in the arc of a circle. In practice this condition would probably not arise because the truck would stop swiveling just before the point $15^x$ moved under the arm 22. This is due to the fact that if there is any tendency for the truck to move in a straight line while the rear truck is moving in the arc of a circle the lateral swinging of the rear end of the body in conjunction with the tendency of the front truck to move in a straight line will tend to move the arm 22 further away from the point $15^x$. This tends to keep the front wheels of the front truck slightly turned so that both trucks move in the arcs of circles having a common center as indicated in Fig. 5. Under these circumstances there is no tendency for the above mentioned swinging action of the rear end of the body to further deflect the front wheels of the front truck, nor will the front truck swivel further with respect to the body because this would tend to straighten up the front wheels of the front truck which action would be immediately followed by another tendency for the arm 22 to move away from the point $15^x$. Fig. 5 therefore represents a balanced condition in which the parts tend to remain as there shown.

It will now be seen that when the arm 22 is moved by the steering mechanism to turn the front wheels of the front truck they will always be reversely turned back toward their positions of alignment with the rear wheels during the swiveling action of the truck with respect to the vehicle body. The swiveling action of the front truck is therefore automatically arrested every time the steering mechanism is operated. Without this feature correct steering of the vehicle would be difficult and probably impossible.

No attempt has been made to indicate in Figs. 3 to 6 the forward movement of the vehicle nor the turning of it. It is believed that the description alone makes it clear that in each of Figs. 4, 5 and 6 the vehicle has advanced beyond the position represented by the preceding figure and that likewise in each of these figures the vehicle has increased its turning angle.

The improved steering mechanism herein disclosed prevents swiveling movement of the front truck more than an amount intended by the operator of the vehicle and therefore accomplishes the main object of the invention. The vehicle is always under control and there is no danger of a sudden lateral motion being imparted to the vehicle body by an unintentional deflection of the front wheels of the front truck to an excessive angle. Heretofore vehicles of this type were difficult to steer and manage due to the lag between the turning movement of the front wheels and the actual lateral movement of the forward end of the vehicle body. This lag was confusing and sometimes caused the operator to steer the front truck more than the desired amount to effect the desired turning movement of the vehicle body. The present invention eliminates any possibility of the front truck swiveling more than the desired amount. As an added precaution the front truck is swiveled to the vehicle frame at a point which is in advance of the central point between the four wheels of the truck. In other words, the swiveling connection between the front truck and the body frame is near the front axle of the truck. Therefore, as soon as the front truck starts to change its direction of movement the motion is almost instantaneously imparted to the vehicle body. As the vehicle body responds almost instantly to the swiveling motion of the front truck the confusion in steering vehicles of this character is considerably lessened. The rear truck need not be swiveled to the body frame at a point near the front axle of the truck, but may be swiveled in the usual manner at the central point between the four wheels.

While one form of steering mechanism for the front truck has been specifically described because it is the preferred form, the same results may be obtained by mechanism differing in whole or in part in mechanical construction, and therefore the very specific description above given should not be construed in a restricting sense. Furthermore, any suitable type of steering mechanism may be employed for the rear truck, the type herein disclosed being given as an example only.

I claim:

1. In a vehicle, a body, a bogie having front and rear wheels, a pivotal connection between the forward end of the body and the bogie, mechanism on the bogie adapted when actuated to turn the front wheels of the bogie, and actuating means on the body comprising a movable member connected to said mechanism on the bogie at a point which is displaced laterally when said member is moved, said actuating means being adapted to be held stationary as the bogie swivels with respect to the body, and said laterally displaced point of connection also being adapted to be held stationary in its displaced position as the bogie swivels with respect to the body so that as the bogie swivels said mechanism and actuating means will cause the front wheels of the bogie to reversely turn toward alinement with the rear wheels.

2. In a vehicle, a body, a bogie having front and rear wheels, a pivotal connection between the forward end of the body and the bogie, mechanism on the bogie adapted when actuated to turn the front wheels of the bogie, said mechanism including a member pivoted to the bogie, means on the body for actuating the said mechanism comprising a movable element connected to said member on the bogie at a point non-coincident with the pivotal mounting of said member and which point is displaced laterally when said element is moved, said element being adapted to be held stationary as the bogie swivels with respect to the body, and said laterally displaced point of connection also being adapted to be held stationary in its displaced position as the bogie swivels with respect to the body, so that as the bogie swivels said actuating means on the body and mechanism on the bogie will cause the front wheels of the bogie to reversely turn toward alinement with the rear wheels.

3. In a vehicle, a body, a bogie having front and rear wheels, a pivotal connection between the bogie and the forward end of the body, a tongue mounted on the bogie to swing about a substantially vertical axis and operatively connected with the front wheels of the bogie to turn the same, and steering means on the body for operating the tongue, said means comprising an arm mounted to swing about the axis of the pivotal connection between the bogie and body and having a pivotal connection with said tongue.

4. In a vehicle, a body, a bogie having front and rear wheels, a pivotal connection between the forward end of the body and the bogie, a tongue mounted on the bogie to swing about a substantial vertical axis and operatively connected with the front wheels of the bogie to turn the same, and actuating means on the body for operating the tongue comprising a member connected to said tongue at a point which is displaced laterally when said actuating means is operated whereby when the bogie swivels with respect to the body said laterally displaced point of connection between the tongue and said member being held stationary with respect to the body will cause the tongue to reversely turn the front wheels of the bogie toward alignment with the rear wheels.

5. In a vehicle, the combination of a bogie having front and rear wheels, a swivel connection between the bogie and the vehicle body, steering mechanism for the front wheels of the bogie comprising a tongue operatively connected with the front wheels to steer the same and means associated with the vehicle body and having a pivotal connection with the tongue for setting said pivotal connection at a predetermined point whereby when the bogie swivels with respect to the body, the front wheels of the bogie will be reversely turned toward alignment with the rear wheels.

6. In a vehicle the combination of a four wheel bogie on which the vehicle body frame is swiveled, steering mechanism for the front wheels of the bogie, comprising a tongue pivotally mounted on the bogie to swing about a vertical axis, said tongue being operatively connected to said front wheels to steer the same when the tongue is actuated in a horizontal plane, and actuating means supported from the body frame and comprising an arm mounted to swing about a vertical axis, a pivotal connection between said arm and tongue, and means to actuate said arm.

7. In a vehicle having a four wheel bogie on which the vehicle body frame is swiveled, the combination with the two front wheels of the bogie of steering mechanism therefor, comprising an arm pivotally supported on the bogie to swing in a horizontal plane, said arm being operatively connected to said front wheels to steer the same, and actuating means comprising a second arm supported from the body frame having a pivotal and sliding connection with the first named arm, and means to actuate said arm.

8. In a vehicle, the combination of a four wheel bogie, a hollow king pin serving as a pivotal connection between the vehicle body and the bogie, an arm pivotally associated with the bogie and mounted to swing in a horizontal plane, said arm being operatively connected with the front wheels of said bogie to steer the same, a second arm mounted to swing about the axis of said king pin and having a pivotal connection with said first named arm and means extending through said king pin for swinging said second named arm about its axis to thereby shift the position of said tongue.

9. In a vehicle, the combination of a bogie having front and rear wheels, a swivel connection between the vehicle body and the bogie, steering mechanism for the front wheels of the bogie comprising a tongue operatively connected with said front wheels and adapted to swing in a horizontal plane to steer said front wheels, and actuating means for said tongue comprising a swinging arm pivotally associated with the body of the vehicle and having a pivotal and sliding connection with said tongue, and means to swing said arm to thereby actuate the tongue.

In testimony whereof I affix my signature.

OLIVER F. WARHUS.